United States Patent [19]

Herbst

[11] Patent Number: 4,805,851

[45] Date of Patent: Feb. 21, 1989

[54] TURBINE ENGINE MOUNTING BRACKET ASSEMBLY

[76] Inventor: Paul T. Herbst, Lord Corporation, 2000 W. Grandview Blvd, P.O. Box 10038, Erie, Pa. 16514-0038

[21] Appl. No.: 83,218

[22] Filed: Aug. 10, 1987

[51] Int. Cl.$^4$ .............................................. B64D 27/26
[52] U.S. Cl. ..................... 244/54; 248/557
[58] Field of Search ............................ 244/53 R, 54; 248/554–557; 60/39.31

[56] References Cited

U.S. PATENT DOCUMENTS

| | | | |
|---|---|---|---|
| 2,365,421 | 12/1944 | Lord | 248/556 |
| 2,650,050 | 8/1953 | Chandler | 244/54 |
| 3,168,270 | 2/1965 | Bligard et al. | 244/54 |
| 3,288,404 | 11/1966 | Schmidt et al. | 248/5 |
| 3,727,862 | 4/1973 | Kaufhold et al. | 244/54 |
| 3,831,888 | 8/1974 | Baker et al. | 244/54 |
| 4,013,246 | 3/1977 | Nightingale | 244/54 |
| 4,022,018 | 5/1977 | Tuten et al. | 244/54 |
| 4,437,627 | 3/1984 | Moorehead | 244/54 |
| 4,458,862 | 7/1984 | Moville | 248/257 |
| 4,560,122 | 12/1985 | Parkinson | 248/559 |
| 4,603,821 | 8/1986 | White | 244/54 |
| 4,603,822 | 8/1986 | Chee | 244/54 |
| 4,634,081 | 1/1987 | Chee | 244/54 |
| 4,717,094 | 1/1988 | Chee | 244/54 |

*Primary Examiner*—Galen Barefoot
*Assistant Examiner*—Rodney Corl

[57] ABSTRACT

A mounting bracket assembly particularly suited for installation in an aircraft having outboard turbine engines to isolate the aircraft cabin from engine noises. The bracket assembly incudes a base fastened below the wing pylon and a pair of arms extending in spaced parallel relation below the base. The forward ends of the arms are connected to the engine, and the aft ends are interconnected to a torque tube which is resiliently fastened to the mounting bracket base by an elastomeric bearing assembly. The elastomeric bearing assembly includes a series of laminations of elastic and inelastic layers which extend along diametrically opposite upper and lower sides of the torque tube to mount the arms in resilient cantilever fashion to the base. The elastomeric bearing assembly permits the arms to rock about a pivot axis through the torque tube while accommodating other motions of the arms, such as vertical translations and relative angular displacements imposed under certain engine operating conditions.

16 Claims, 4 Drawing Sheets

TURBINE ENGINE MOUNTING BRACKET ASSEMBLY

FIELD OF THE INVENTION

The present invention relates to aircraft engine mounts, and more particularly, the present invention relates to engine mounts particularly suited for supporting a turbine engine below the wing of an aircraft.

BACKGROUND OF THE INVENTION

In certain types of aircraft, turbine engines are mounted to pylons depending from the aircraft wings. Generally, fore and aft mounting bracket assemblies and auxiliary structures connect the engine to the pylon in a manner that accommodates a variety of engine mounting requirements, such as thrust reaction, torque reaction, and a variety of static and dynamic loading conditions. In addition to meeting these requirements, the mounting brackets must accommodates severe operating conditions, including high temperatures and vibrations.

Various structures have been proposed for mounting turbine engines to aircraft wings. Examples of such structures may be found in the following U.S. Pat. Nos.: 3,288,404; 3,727,862; 3,831,888; 4,013,246; 4,022,018; 4,437,627; 4,603,821; and 4,603,822.

Of the aforementioned patented engine mounting structures, U.S. Pat. No. 4,603,822 discloses an aft engine mount for fastening a turbine engine below the wing of an aircraft. While the disclosed mount may function satisfactorily for its intended purpose, there is a need for an aft engine mount which aids in isolating the aircraft cabin from engine developed noises. Heretofore, there has not been commercially available an aft turbine engine mounting bracket assembly which accomplishes this objective while accommodating the aforedescribed mounting requirements and severe operating conditions encountered.

U.S. Pat. No. 3,288,404, issued to the assignee of the present application, discloses a turbine engine mounting system for a helicopter. The system includes a front mount that has a torque shaft with arms at opposite ends connected to a gearbox and an elastomeric bearing resiliently connecting the torque shaft to the aircraft fuselage via ancillary fittings. While this patented system functions satisfactorily for mounting a turbine engine to a helicopter fuselage, it is not suitable for solving the aforementioned noise problem associated with certain types of aircraft powered by wing-mounted turbine engines.

OBJECTS OF THE INVENTION

With the foregoing in mind, a primary object of the present invention is to provide a novel mounting bracket assembly for isolating an aircraft cabin from engine noises.

Another object of the present invention is to provide an improved mounting bracket assembly which is particularly suited for reacting a variety of static and dynamic turbine engine motions and loads while simultaneously isolating the aircraft cabin from engine generated noises.

A further object of the present invention is to provide a unique mounting bracket assembly particularly suited for connecting the aft end of a turbine engine to a wing pylon in either an original or retrofit mode to minimize engine generated noise transmitted to the aircraft cabin.

SUMMARY OF THE INVENTION

More specifically, the present invention provides a mounting bracket assembly particularly suited for isolating the cabin of an aircraft from turbine engine noises. The mounting bracket assembly includes a mounting base which is adapted to be carried by the aircraft wing pylon and an engine attachment fitting which is resiliently connected to the mounting base by means of a unique laminated elastomeric bearing. The engine attachment fitting comprises arm means extending in spaced parallel relation alongside the mounting base and torque shaft means interconnecting the arm means and mounting the same via the laminated elastomeric bearing means in a cantilever manner to the mounting base. The elastomeric bearing means, the torque shaft means and the mounting base have cooperating eccentric surfaces which are configured with respect to the pivot axis of the torque shaft means to provide a desired elastic spring rate during rocking motion of the arm means. Abutment means carried by the mounting base means limits pivotal movement of the arm means and other movement of the torque shaft means including axial motion on its pivot axis. The thus-described mounting bracket assembly, when secured between the aft end of a turbine engine and a wing pylon, accepts various static and dynamic engine mounting requirements while significantly attenuating engine noises.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENT

Figure 1:
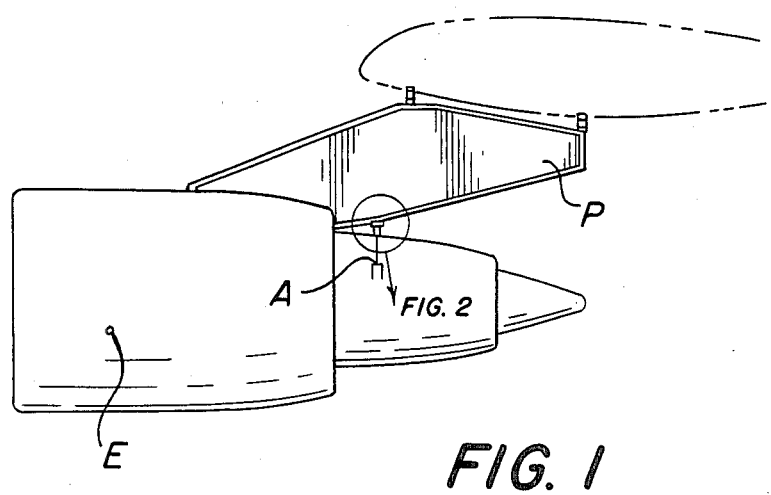
FIG. 1 is a somewhat schematic side elevational view illustrating in full lines a turbine engine carried below and forward of the wing of an aircraft (shown in phantom lines) by an aft mounting bracket assembly which embodies the present invention.

Referring now to the drawings, FIG. 1 illustrates in phantom lines an aircraft wing extending laterally from the aircraft fuselage (not shown) with a pylon structure P depending from the wing and extending forwardly thereof for carrying a turbine engine E. The engine E is secured to the wing pylon P by fore and aft engine attachment assemblies. The present invention is directed to the aft engine attachment assembly A.

Figure 3:
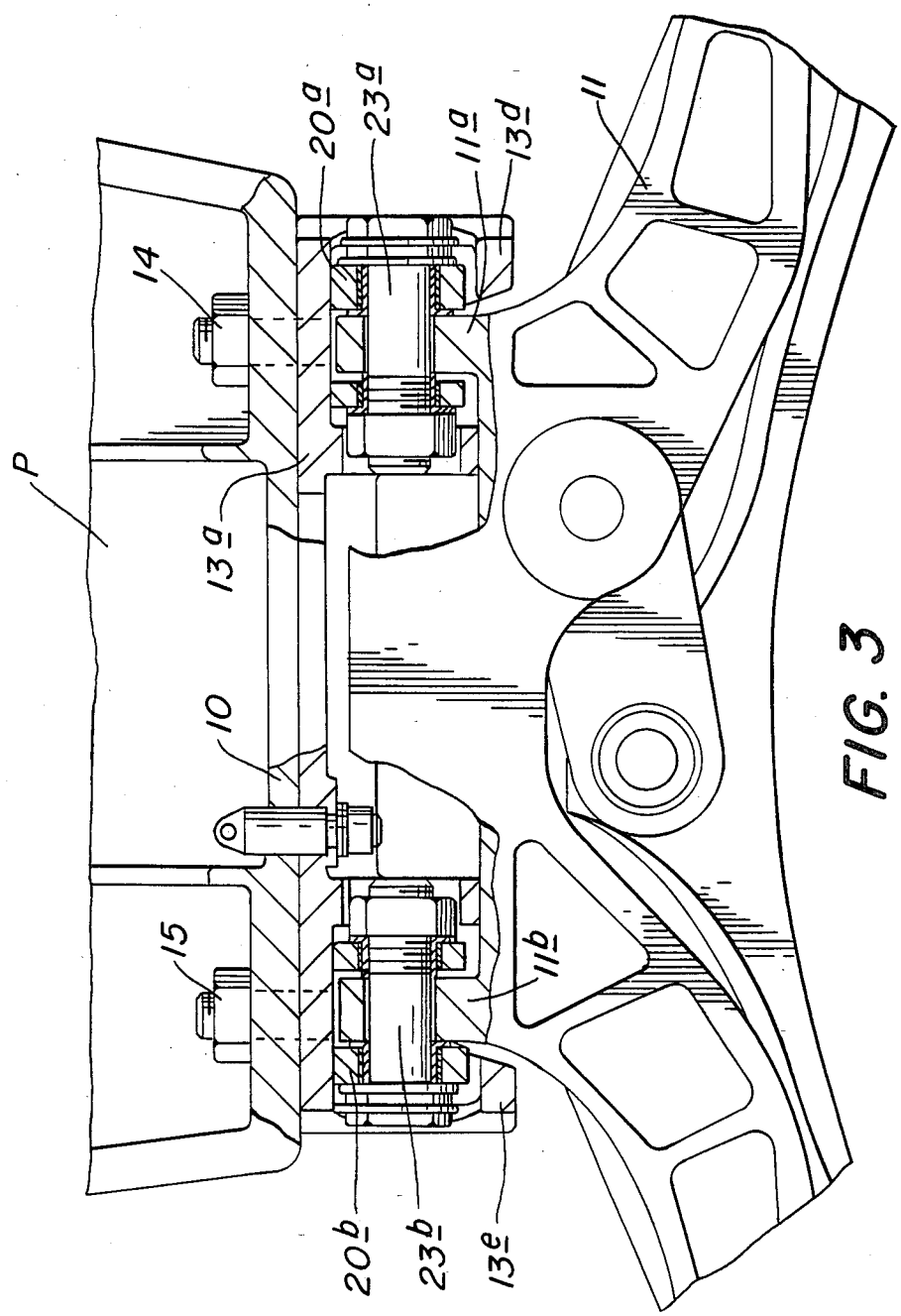
FIG. 3 is a greatly enlarged, fragmentary sectional view of the aft mounting bracket assembly embodying the present invention shown connected to engine support structure, the view looking aft, or rightward, in FIG. 1.

As best seen in FIG. 3, the conventional aft engine attachment assembly includes a plate 10 provided on the pylon P and a linkage assembly 11 substantially circumscribing the turbine engine E. The linkage 11 has upstanding lugs 11a, 11b which are fastened to the pylon plate 10 by bolts passing horizontally through clevises such as in the manner illustrated in U.S. Pat. No. 4,603,822, the disclosure of which is incorporated by reference herein.

While the aforementioned patented aft engine mounting structure may function satisfactorily for its intended purposes, such as to accommodate longitudinal dimensional changes of the engine due to thermal expansion and contraction, to react engine torque, and to carry vertical static and dynamic loads, there is a need for an aft engine mounting bracket assembly which not only meets these requirements but also limits the transmission of engine noise into the aircraft cabin. To solve the noise problem in existing aircraft, there is a need for such a mounting bracket assembly to be capable of being readily retrofitted between the wing pylon plate and engine without any modification to either the aircraft or engine structure.

Figure 2:
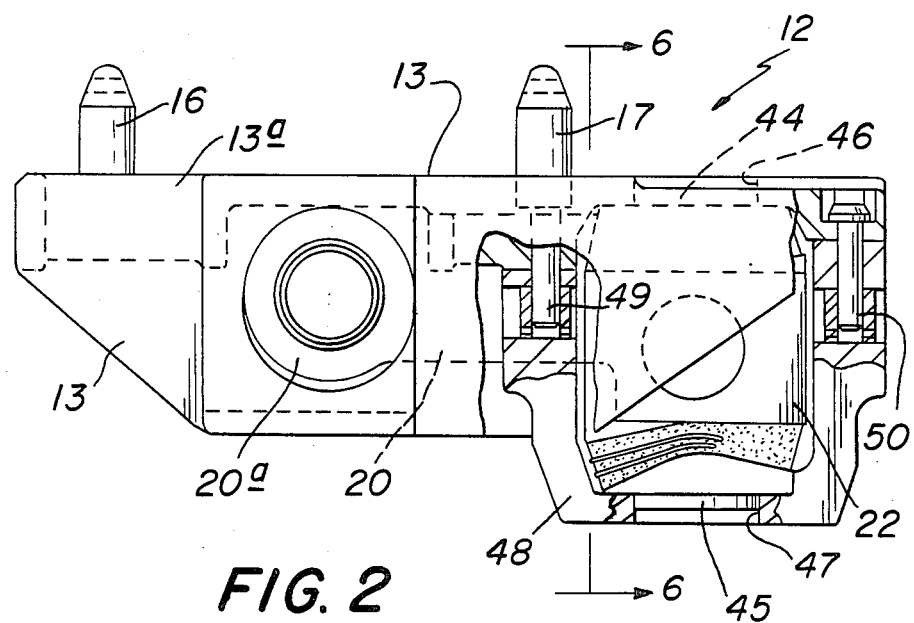
FIG. 2 is an enlarged side elevational view of the aft mounting bracket attachment region indicated in FIG. 1, the view being partially broken away and sectioned to illustrate certain details of construction.

The present invention solves the aforementioned problems. To this end, as best seen in FIG. 2, the present invention provides an improved aft engine mounting bracket assembly 12 which mounts between the wing pylon P and the engine E. The mounting bracket assembly 12 includes a mounting base 13 adapted to be fastened to the wing pylon plate 10 and an attachment fitting assembly F (FIG. 5) adapted to be connected to the engine E. As will be described, the attachment fitting assembly F is resiliently mounted in cantilever fashion to the mounting base 13.

Figure 4:
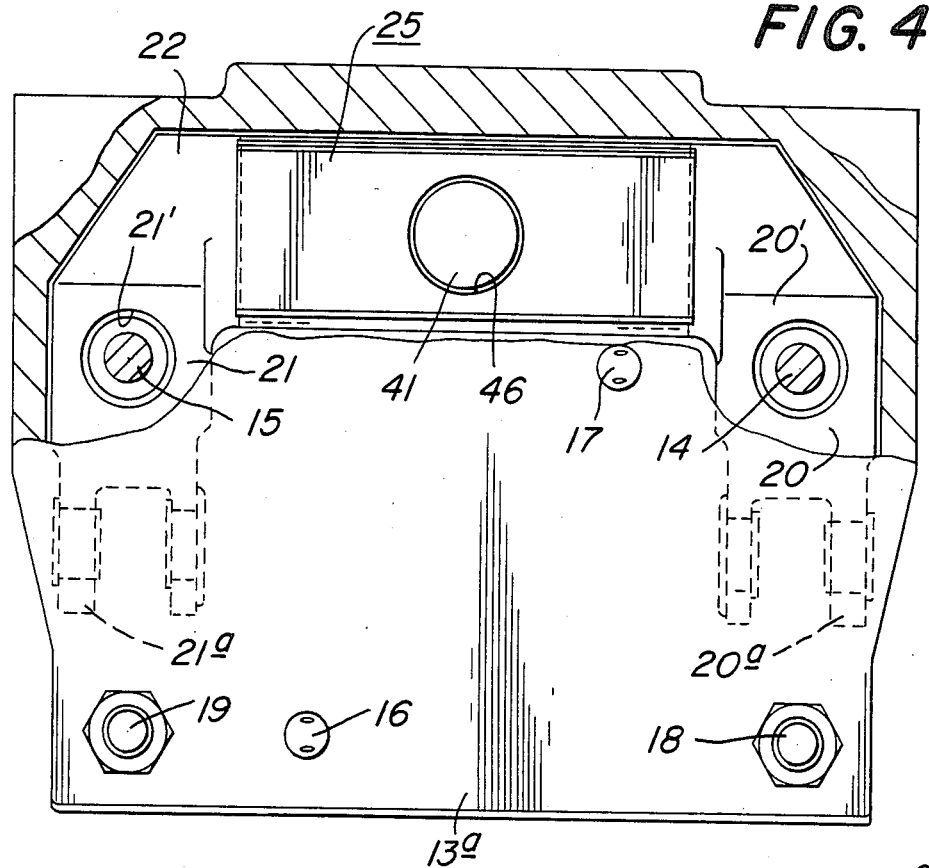
FIG. 4 is a top plan view of the mounting bracket assembly of the present invention, the view looking downward in FIG. 2, but with portions broken away and sectioned to illustrate certain construction details.

As illustrated in FIGS. 2 and 4, the mounting base 13 includes a base plate 13a which is releasably fastened to the underside of the wing nylon plate 10 by a series of high-strength attachment bolts 14, 15, 18 and 19 that project upwardly through the base plate 13a and are received in holes in the wing pylon plate 10. See FIGS. 2 and 3. As best seen in FIG. 4, the base plate 13a is substantially rectangular in plan and has a top side which is flat so that when the attachment bolts 14, 15, 18 and 19 are tightened, the base 13 extends flush against the wing pylon plate 10 and substantially horizontally between it and the engine E. Shear pins 16, 17, project upwardly from the base plate 13a and engage in spaced vertical bores in the wing pylon plate 10 to react shear loads applied to the wing pylon P by the engine linkage 11 when countering engine torque. The attachment bolts 14, 15, 18 and 19 accommodate other loads, such as vertical loads.

Figure 5:
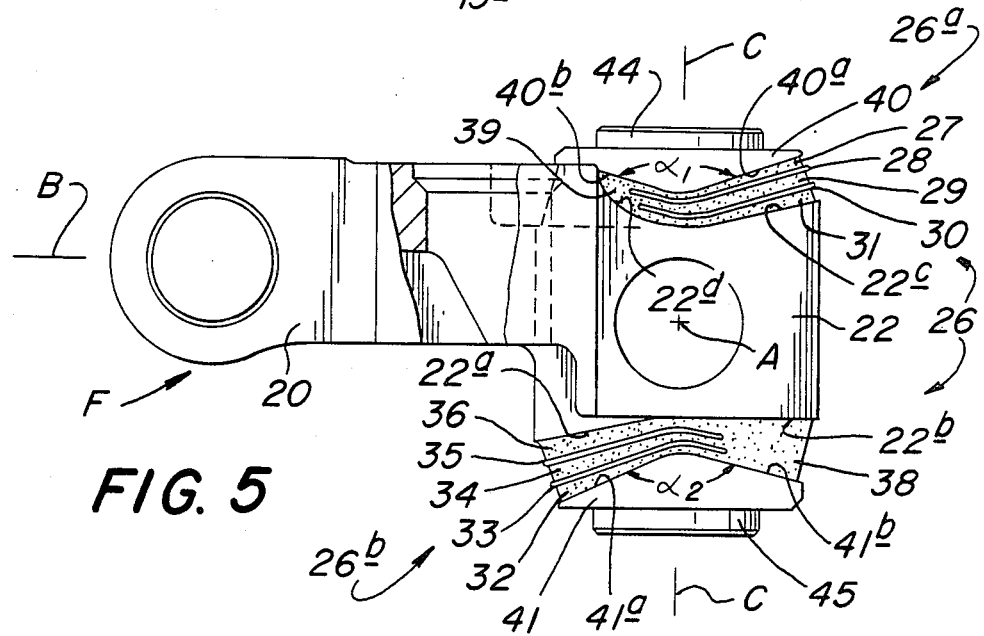
FIG. 5 is a partially broken away and sectioned side elevational view of a subassembly of the mounting bracket which embodies the present invention.

To connect the engine linkage lugs 11a, 11b, to the mounting base 13, the attachment fitting assembly F includes arm means which, in the present instance, comprise a pair of parallel arms 20, 21 (FIG. 4) extending horizontally in spaced parallel relation in the fore and aft direction of the aircraft. The arms 20, 21 have clevises 20a, 21a, respectively, at their forward ends for receiving attachment bolts 23a, 23b (FIG. 3) which pass through the linkage lugs 11a, 11b. The arms 20, 21 are rigidly connected together at their aft ends remote from their clevises 20a, 21a by an integral torque tube, or shaft, 22 which extends horizontally between the arms transversely of the aircraft fuselage. The arms 20, 21 and the torque tube 22 define a subassembly having a generally U-shaped pin configuration. The arms 20, 21 and the torque tube 22, are preferably machined of one-piece high-strength metal alloy, such as 15-5 stainless steel, and the torque tube 22 is through-bored to provide a lightweight yet torsionally-stiff connection between the arms. This connection enables the arms 20, 21 to pivot in unison about the central torque tube axis A while minimizing angular displacement relative to one another about the axis A, such as can occur when reacting engine torque. As best seen in FIGS. 4 and 5, each arm 20, 21 has a vertical transverse through bore 20', 21', respectively, that provides access to the aft attachment bolts 15, 14, respectively for enabling the engine mounting bracket assembly 12 to be connected to and disconnected from the wing pylon plate 10.

To provide the desired resilient cantilever mounting of the arms 20, 21 to the mounting base 13, the attachment fitting assembly includes a laminated elastomeric bearing assembly 26 that connects the torque tube 22 to the mounting base 13. As best seen in FIG. 4, the elastomeric bearing 26 is horizontally elongate and extends along the torque tube 22 substantially the entire distance between the arms 20, 21 at their aft ends. The elastomeric bearing 26 includes an upper bearing component 26a and a lower bearing component 26b, the components being located on diametrically opposite sides of the longitudinal axis A of the torque tube 22.

Each elastomeric bearing component, such as the upper component 26a, is of laminated construction and includes a series of layers of elastic material, such as the layers 27, 29 and 31 alternating with and bonded to shaped layers of inelastic material, such as the angulated metal shims 28 and 30. The innermost elastic layer 31 is bonded to the torque tube 22, and the outermost elastic layer 27 is bonded to a rigid elongate retainer element 40 which overlies the torque tube 22 and extends therealong in spaced parallel relation therewith. The lower bearing component 26b of the elastomeric bearing 26 is of like construction to the upper bearing component and includes a series of elastomeric layers 32, 34 and 36 separated by and bonded to inelastic layers provided by shaped metal shims 33 and 35. The uppermost layer 36 is bonded to the torque tube 22, and the lowermost layer 32 is bonded to a rigid retainer element 41 which is like in construction to the retainer element 40 and extends along the underside of the torque tube 22 in spaced parallel relation therewith.

As best seen in FIG. 5, both the upper and lower retainer elements 40 and 41 have angulated surfaces 40a, 40b and 41a, 41b, respectively which converge and define dihedral angles $\alpha_1$, $\alpha_2$, respectively which face outwardly in opposite directions with respect to the pivot axis A of the torque tube 22. The relatively inelastic metal shims, such as the metal shims 33 and 35 of the lower bearing component 26b, have shallow V-shaped transverse cross-sections and are arranged in substantially parallel relation with respect to one another and the surfaces 36 and 41a, of the torque tube 22 and lower retainer element 41. Preferably the metal shims 33 and 35 converge slightly toward one another in the zones between the apex of the angulated surfaces 41a, 41b and the bottom of the torque tube 22. While the metal shims 33 and 35 may extend completely along the angulated surfaces 41a, 41b, preferably they terminate slightly aft of the apex of the angle $\alpha_2$ to provide the elastomeric bearing component 26b with a major portion forward of the torque tube pivot axis A which is stiff and a minor portion aft thereof providing a region 38 which is less stiff, being composed substantially entirely of elastomeric material. Because the solid elastomeric regions 38 and 39 of the elastomeric bearing 26 are not subjected to the same magnitude of compressive loading as the laminated portions thereof, there is less need for metal shims to be present at these locations.

The upper metal shims 28 and 30 are of the same configuration as the lower shims but are arranged differentialy with respect to the torque tube pivot axis A. As best seen in FIG. 5, the major portions of the metal shims 33 and 35 of the lower component 26b of the elastomeric bearing 26 are located diametrically opposite the major portions of the metal shims 28 and 30 of the upper component 26a of the elastomeric bearing 26. The major portions of the diametrically opposite shims extend substantially parallel to one another and are located diagonal with respect to the longitudinal axis B of the arms 20, 21. The metal shims and the surfaces which are juxtaposed therewith in each bearing component, such as the surface 22a on the underside of the torque tube 22 and the surface 41a of the retainer element 41 which confront the shims 33 and 35, are arranged in a non-concentric, or eccentric, relation with respect to the pivot axis A of the torque tube 22. The upper surface 22c on the torque tube 22 is similarly arranged with respect to its complementary juxtaposed surface 40a on the upper retainer 40. As a result of this somewhat eccentric disposition of surfaces and shims on diagonal diametrically opposite sides of the torque tube pivot axis A, counterclockwise pivotal movement of the arms 20, 21 about the pivot axis A of the torque tube 22 causes the elastomeric layers 32, 34 and 36 of the lower bearing component 26b and the elastomeric layers 27, 29 and 31 of the upper bearing component 26a, to be compressed and to reset the applied forces in a manner well known in the laminated elastomeric bearing art.

To counteract the aforedescribed arm motion and resulting compression of the elastomeric layers while permitting certain other motions between the arms 20, 21 and the base B, the elastomeric bearing 26 is fastened to the base by means of a shear pivot connection. To this end, the bearing retainers 40 and 41 each have short cylindrical stubs 44 and 45, respectively, which extend diametrically outward with respect to the torque tube pivot axis A. The upper stud 44 is received in a cylindrical bore 46 provided in the plate portion 13a of the base 13 (FIG. 2), and the lower stud 45 is received in a cylindrical bore 47 provided in a U-shaped cap 48 which extends along the underside of the torque tube 22. The cap 48 is releasably connected to the base 13 by a series of bolts, such as the bolts 49, 50 (FIG. 2) which pass downwardly through the base plate 13a and are threadedly received in the cap 48 in spaced relation along fore and aft sides of the torque tube 22. Thus, the stubs 44 and 45 of the retainer elements 40 and 41 of the upper and lower components 26a, 26b of the elastomeric bearing 26 react the aforementioned compressive strains within the various elastomeric layers caused by downward pivotal movement of the arms 20, 21 with respect to the pivot axis A of the torque tube 22. In addition, the stubs 44, 45 react shear strains induced in the elastic layers by other motions of the torque tube 22, such as axial motion on its axis A. The central location of the stubs 44 and 45 with respect to the torque tube 22 enables the same to pivot slightly about a vertical axis C under certain conditions, such as when the arms 20, 21 are displaced angularly relative to one another in countering engine torque.

Figure 6:
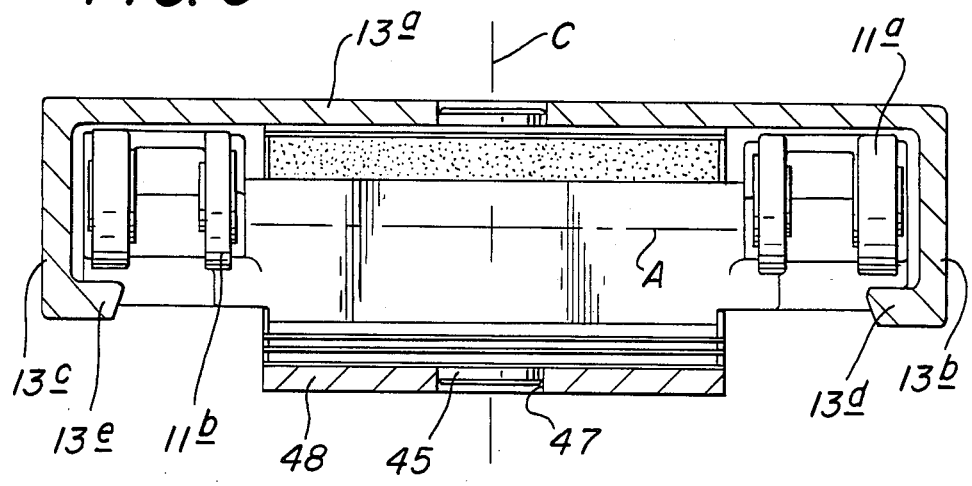
FIG. 6 is a transverse sectional view taken on line 6—6 of FIG. 2.

The present invention includes means to limit excessive displacement of the arms 20 and 21 relative to the torque tube pivot axis A. In the illustrated embodiment, upward, or clockwise, arm motion (FIG. 2) is restrained by the plate portion 13a of the mounting base 13 which overlies the arms 20 and 21 and engages the clevis portions 20a, 21a thereof to limit such displacement. Downward displacement, or counterclockwise motion (FIG. 2) of the arms 20, 21 about the pivot axis A, is limited by a pair of flanges 13b, 13c (FIG. 6) which depend from the sides of the base plate 13a and extend lengthwise in parallel relation along opposite outboard sides of the arms 20 and 21, respectively and along opposite ends of the torque tube 22 (FIG. 4). The lower portions of the flanges 13b, 13c are provided with inturned shoulders 13d, 13e, respectively, which normally underlie the clevises 20a, 21a at the forward ends of the arms 20, 21 in spaced relation but which engage the clevises to limit excessive downward excursions of the arms 20, 21. As best seen in FIG. 4, sufficient clearance is provided between the base 13 and the arms 20, 21 and torque tube 22 as to permit them to translate slightly in the directions indicated schematically in FIG. 7 without metal to metal contact, but with excessive excursions of the arms 20 and 21 beyond these slight amounts being positively arrested by the aforedescribed base structure which provides direct metal to metal contact.

When the mounting bracket assembly 12 is connected between the wing pylon plate 10 and the engine linkage 11 in the manner illustrated in FIG. 3, under static operating conditions the weight of the aft end of the engine E pulls downward on the arm clevises 20a, 21a, causing the arms 20, 21, and the torque tube 22 connected thereto, to pivot about the transverse torque tube axis A. As the torque tube 22 pivots, its eccentric diagonal surfaces 22a, 22c cooperate with the complementary juxtaposed surfaces 41a and 40a of the bearing retainer elements 41 and 40, respectively to compress the elastic layers 32, 34 and 36 and 27, 29, 31; therebetween, thereby causing the weight of the aft end of the engine to be reacted essentially by compressive strains within the various elastomeric layers. Some of the weight is also reacted by compression in other regions of the lower elastomeric bearing component 26b. Under certain dynamic operating conditions, various motions of the arms 20, 21 and torque tube 22 relative to the base 13 are accommodated by reductions in compressive strains among the elastomeric layers, such as might be induced by an upward motion of the arms 20, 21 caused by a sudden upward movement of the engine E relative to the wing pylon P. Other arm motions such as axial and transverse to the torque tube are accommodated by shear strains among the various elastomeric layers. As a result, except for the constrains imposed on the arms 20, 21 and torque tube 22 at the limits of their excursions by direct metal-to-metal snubbing contact with the base 13, the arms 20, 21 are isolated from the wing pylon P by several layers of elastomeric material. This has the effect of significantly attenuating engine noises which would otherwise be transmitted into the aircraft cabin via the linkage 11 and pylon P.

By way of example, and not by way of limitation, it has been found desirable for the static spring rate of the assembly to be at least about 25,000 pounds per inch in the vertical direction (orthogonal to axis A) and 37,000 pounds per inch in the lateral direction (along axis A).

To achieve the desired spring rate, the elastomeric material of each of the elastic layers is preferably composed of a synthetic rubber having, when cured, an effective compression modulus in a range of about 1,000 to about 10,000 psi, and a shear modulus in a range of about 500 to about 1,000 psi. Since the temperature of the bracket assembly can exceed 400° F., due to its proximity with the engine, the elastomeric material must also be resistant to thermal degradation. The elastomeric layers are bonded to their associated metal surfaces in accordance with conventional elastomeric bearing manufacturing techniques, as well known in the art. For a more detailed discussion of such techniques, reference is made to a handbook entitled "High Capacity Laminate Design Guide" published by Lord Corporation, Erie, Pa., the disclosure of which is incorporated by reference herein.

The illustrations of the preferred form of bracket assembly according to the present invention are to scale, a point of reference being the horizontal center to center distance between the pivot axis A of the torque tube 22 and the centers of the arm clevises 20a, 21a of five inches. In the illustrations, the various metal shims and cooperating angulated surfaces are disposed with their dihedral angles facing away from one another, i.e. outward of the pivot axis A of the torque tube 22. While this arrangement is preferred, these surfaces can be arranged with their dihedral angles $a_1$, $a_2$ facing toward one another from opposite sides of the torque tube pivot axis A. Moreover, as noted heretofore, in some applications it may be desirable for the upper and lower components of the elastomeric bearing 26 to have either a greater or a lesser number of metal shims which may, or may not, extend the full distance of the angulated surfaces of the retaining elements 40 and 41.

In view of the foregoing, it should be apparent that the present invention now provides an improved engine mounting bracket assembly which is particularly suited for securing a turbine engine to a wing pylon located outboard of an aircraft fuselage. The bracket assembly is designed to be installed not only in new aircraft, but also to be retrofitted quickly and easily into existing aircraft in which it may be desirable to effect further reduction in cabin noise. As compared with an aft mounting bracket assembly of a conventional design such as described heretofore, the mounting bracket assembly of the present invention has been found to reduce cabin noise by a significant level.

While a preferred embodiment of the present invention has been described in detail, various modifications, alterations and changes may be made without departing from the spirit and scope of the present invention as defined in the appended claims.

I claim:

1. A mounting bracket assembly for use in isolating vibrations in an aircraft having a turbine engine, comprising:
   mounting base means adapted to be secured to the aircraft for carrying the engine;
   an engine attachment fitting assembly disposed between said mounting base means and the engine, said attachment fitting assembly having arm means extending alongside said mounting base means and torque shaft means extending laterally of said arm means at one end thereof, said arm means adapted to be connected to said engine at a location spaced from said torque shaft means;
   laminated elastomeric bearing means connecting said torque shaft means to said mounting base means and mounting said arm means in cantilever fashion to permit said torque shaft means to pivot about a pivot axis in response to displacement of said arm means;
   abutment means carried by said mounting base means for limiting at least pivotal motion of said arm means about said torque shaft pivot axis; and
   said laminated elastomeric bearing means including surface means carried by said torque shaft means and said base means for compressing the laminated elastomeric bearing means on diametrically opposite sides of said pivot axis when said arm means pivots about said pivot axis while permitting other resilient displacements of said torque shaft with respect to said pivot axis;
   whereby the mounting bracket assembly attenuates engine noises transmitted to the aircraft cabin.

2. A mounting bracket assembly according to claim 1 wherein said surface means includes a pair of juxtaposed surfaces extending along diametrically opposite sides of said torque shaft pivot axis, and said laminated elastomeric bearing means includes a plurality of laminations of extensible and inextensible layers engaged between said pair of said surfaces.

3. A mounting bracket assembly according to claim 2 wherein said arm means includes a pair of arms rigidly connected to and extending in spaced parallel relation from said torque shaft means, and said surfaces and laminations extend between said arms along said diametrically opposite sides of said torque shaft means in non-concentric relation with respect to said pivot axis.

4. A mounting bracket assembly according to claim 3 wherein said laminations and surfaces are located both diagonally opposite one another with respect to said torque shaft pivot axis and above and below said arms.

5. A mounting bracket assembly according to claim 4 wherein one of said pair of surfaces is provided on said torque shaft means and the other of said pair of surfaces is carried by said base means.

6. A mounting bracket assembly according to claim 5 wherein said abutment means includes a pair of flanges depending from said mounting base means and extending in spaced relation along opposite sides of said attachment fitting assembly and inturned shoulders on said flanges engageable with said arms to limit downward displacement thereof away from said mounting base means.

7. In combination with an aircraft having a turbine engine carried outboard of the aircraft fuselage by a wing, a bracket assembly for mounting the aft end of the engine to the wing and limiting noise transmitted into the fuselage, said bracket assembly comprising:
   mounting arm means disposed below the wing;
   means for connecting one end portion of said mounting arm means to said engine;
   torque shaft means extending laterally of said mounting arm means remote from said one end portion; and
   laminated elastomeric bearing means for connecting said torque shaft means to said wing and mounting said arm means in a cantilever manner for permitting resilient pivotal motion of the arm means about an axis transverse as to fuselage, said elastomeric bearing means including laminations of elastic and inelastic layers extending along said torque shaft means on diametrically opposite sides thereof eccentric to said pivot axis for resiliently restraining pivotal displacement of the arm means about said pivot axis by compressively straining said elastic layers while enabling said elastic layers to accommodate other motions of the torque shaft means relative to its pivot axis;

whereby the engine is mounted to the wing in a manner which minimizes the transmission of engine noise to the aircraft fuselage.

8. A bracket assembly according to claim 7 wherein said arm means extends fore and aft of the aircraft, and said laminations extend along said torque shaft pivot axis on diametrically opposite sides thereof diagonally with respect to said arm means for effecting said compressive straining during pivotal movement of the arm means.

9. A bracket assembly according to claim 8 wherein said arm means includes a pair of arms extending in spaced parallel relation from said torque shaft means with said elastomeric bearing means extending between said arms.

10. A bracket assembly according to claim 9 wherein said arms extend substantially horizontally and said torque shaft pivot axis extends transverse to the aircraft fuselage.

11. In combination with an aircraft having a turbine engine carried by a wing thereof, a bracket assembly mounting the engine to the wing, comprising:

a pair of mounting arms extending longitudinally in fore and aft parallel relation below the wing;

means for connecting first end portions of said mounting arms to said engine;

torque shaft means having a longitudinal axis disposed transverse to the aircraft fuselage for rigidly interconnecting said arms at second end portions thereof;

laminated elastomeric bearing means extending along said torque shaft means for connecting said mounting arms to said wing in a cantilever manner which provides a predetermined spring rate in response to pivotal deflection of the arms about the torque shaft axis, said elastomeric bearing means including laminations of alternating elastic and inelastic layers extending along said torque shaft means on diametrically opposite sides thereof in eccentric relation therewith and complementary surface means cooperable with said laminations for causing said elastic layers on diametrically opposite sides of said pivot axis to undergo elastic compression in response to pivotal movement of the torque shaft means about its pivot axis while accommodating other translations of the torque shaft means; and means carried by said wing for limiting both pivotal motion of said arms about said pivot axis and movement of said torque shaft relative to its pivot axis;

whereby the engine is mounted to the wing in a manner which minimizes the transmission of engine noise to the aircraft fuselage.

12. A bracket assembly according to claim 11 wherein said inelastic laminations and said complementary surfaces extend diagonally along said pivot axis with respect to said arms.

13. A bracket assembly according to claim 12 wherein said surface means diverge from one another on each side of said torque tube pivot axis and said inelastic laminations are similarly arranged therebetween.

14. A bracket assembly according to claim 13 wherein said inelastic layers are provided by metal shims, and said elastic layers are provided by elastomeric material bonded to said metal shims and to said complementary surface means.

15. A bracket assembly according to claim 14 wherein said assembly has a vertical spring rate of at least about 25,000 pounds per inch and a lateral spring rate of at least about 37,000 pounds per inch.

16. A bracket assembly according to claim 15 wherein said elastomeric material includes a synthetic rubber having, when cured, an effective compression modulus in a range of about 1,000 to about 10,000 psi and a shear modulus in a range of about 500 to about 1,000 psi.

* * * * *